United States Patent
Chaloupka et al.

(10) Patent No.: US 10,284,414 B2
(45) Date of Patent: May 7, 2019

(54) SYSTEMS AND METHODS FOR ESTIMATING SKEW

(71) Applicants: Khalifa University of Science, Technology and Research, Abu Dhabi (AE); British Telecommunications PLC, London (GB); Emirates Telecommunications Corporation, Abu Dhabi (AE)

(72) Inventors: Zdenek Chaloupka, Abu Dhabi (AE); Ivan Boyd, Abu Dhabi (AE)

(73) Assignees: Khalifa University of Scence, Technology and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 150 days.

(21) Appl. No.: 15/179,288

(22) Filed: Jun. 10, 2016

(65) Prior Publication Data
US 2017/0359210 A1    Dec. 14, 2017

(51) Int. Cl.
*H04L 27/38*    (2006.01)
*H04L 29/06*    (2006.01)
*H04J 3/06*    (2006.01)

(52) U.S. Cl.
CPC ........ *H04L 27/3854* (2013.01); *H04J 3/0667* (2013.01); *H04L 69/28* (2013.01)

(58) Field of Classification Search
CPC .. H04L 27/2657; H04L 27/3854; H04L 69/28
See application file for complete search history.

(56) References Cited

U.S. PATENT DOCUMENTS

| | | | |
|---|---|---|---|
| 9,444,566 B1* | 9/2016 | Mustiere | H04J 3/0667 |
| 2004/0139375 A1* | 7/2004 | Benesty | H04J 3/0664 |
| | | | 714/700 |
| 2010/0185781 A1* | 7/2010 | Anderson | G06F 15/16 |
| | | | 709/248 |

(Continued)

OTHER PUBLICATIONS

"Clock Synchronization of Wireless Sensor Networks", IEEE Signal Processing Magazine, IEEE Service Center, Piscataway, NJ, US, vol. 28, No. 1, Jan. 1, 2011 (Jan. 1, 2011), pp. 124-138; Yik-Chung Wu et al.

(Continued)

*Primary Examiner* — Jamal Javaid
*Assistant Examiner* — Rosene Clark
(74) *Attorney, Agent, or Firm* — Calfee, Halter & Griswold, LLP

(57) ABSTRACT

This invention relates to methods and systems for estimating skew based on, for example, the IEEE 1588 Precision Time Protocol (PTP). These methods and systems can allow the clock skew between a master clock (server) and slave clock (client) exchanging PTP messages over a packet network to be estimated more rapidly than conventional estimation techniques and thereby improve the convergence of standard estimation algorithms. In one embodiment, the skew estimation is derived from a set of timestamps from a message exchange between the master and slave using a non-linear least square-fitting algorithm. An example of the fitting algorithm is the Levenberg-Marquardt algorithm.

27 Claims, 1 Drawing Sheet

(56) References Cited

U.S. PATENT DOCUMENTS

2014/0068315 A1* 3/2014 Aweya ................. G06F 1/04
  713/503
2017/0093409 A1* 3/2017 Djahanshahi ............ H03B 1/00

OTHER PUBLICATIONS

"Estimation and Removal of Clock Skew From Network Delay Measurements", INFOC0M '99. Eighteenth Annual Joint Conference 0f the IEEE Computer and Communications Societies. Proceedings. IEEE New York, NY, USA Mar. 21-25, 1999, Piscataway, NJ, USA,IEEE, US, vol. 1, Mar. 21, 1999 (Mar. 21, 1999), pp. 227-234; Moon S B et al.

International Search Report, Written Opinion, PCT/GB2016/051723, dated Dec. 7, 2016.

International Application published under the Patent Cooperation Treaty (PCT) with an International Publication No. WO 2005/002100 A1, Jan. 6, 2005.

* cited by examiner

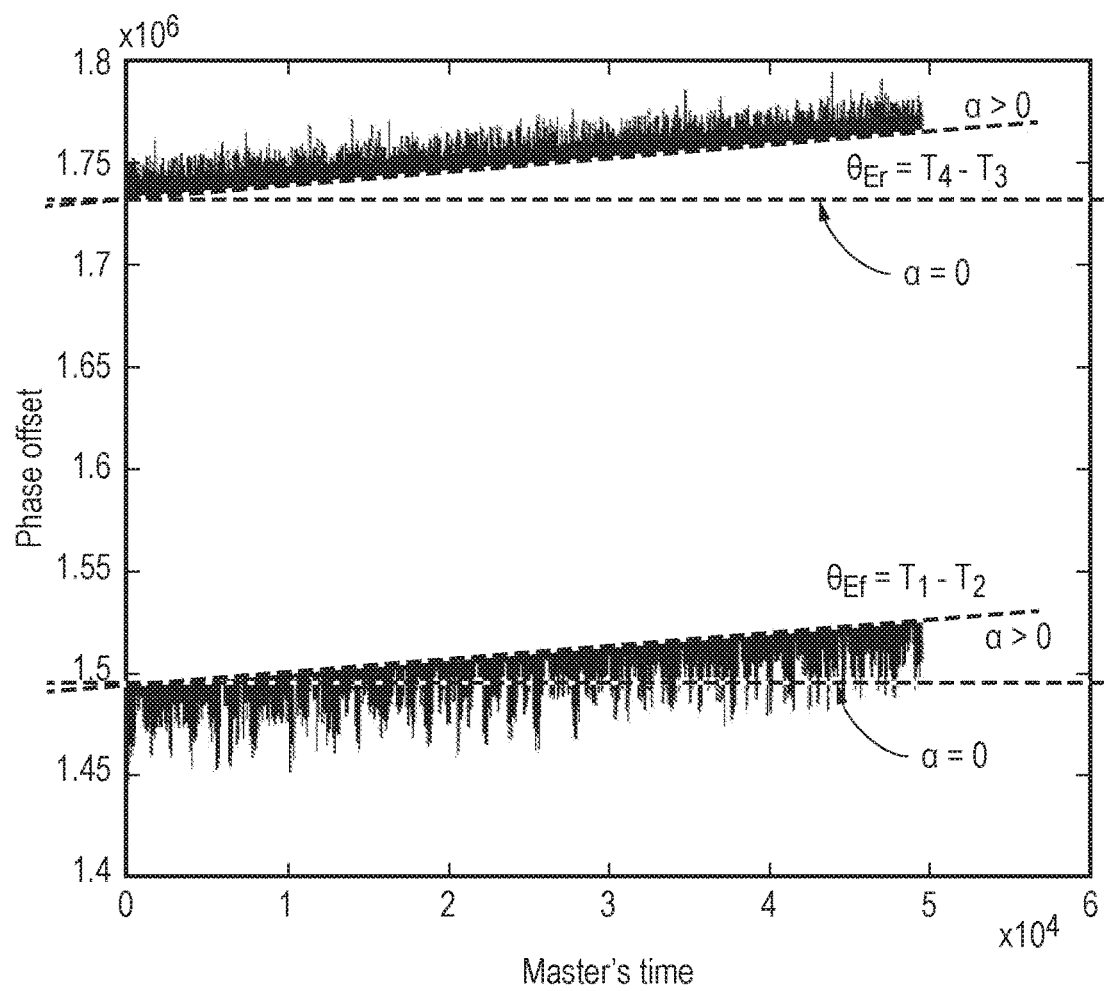

SYSTEMS AND METHODS FOR ESTIMATING SKEW

FIELD OF THE INVENTION

The present invention relates to methods and systems for estimating skew. It is particularly, but not exclusively, related to methods and systems for estimating the clock skew between a master clock (server) and slave clock (client) which are connected over a packet network.

BACKGROUND OF THE INVENTION

Timing synchronization using a protocol such as IEEE 1588 PTP and a well-designed slave clock recovery mechanism can provide time synchronization in the sub-microsecond level and lower. Time sync requires an accurate measurement of the communication path delay between the time server (master) and the client (slave) in order to compute the time offset between them. However, the path delay estimation is done using the important assumption that the time delay from master to slave is equal to that from slave to master. In real life, the communication paths are not perfectly symmetric mainly due to dissimilar forward and reverse physical link delays and queuing delays. Even in cases where the physical link delays are known and properly compensated for during clock synchronization, queuing delays which are variable can still exist when timing messages go through the packet network and queued for forwarding. The processing and buffering of packets in network devices (switches, routers, etc.) introduce variations in the time latency of packets traversing the packet network. This mainly happens when timing transfer is done in an end-to-end manner without any form timing assistance from the network to help mitigate the effects of the variable queuing delays.

To estimate the relationship between a Slave clock and a Master, time synchronisation algorithms usually estimate two parameters, the instantaneous phase offset and the skew (clock frequency difference). These estimation algorithms provide very accurate estimations over time, however, they also take a long time to converge to an accurate set of estimated parameters. The Kalman filter is an example of one such time synchronisation algorithm.

An object of the present invention is to provide methods and devices which can quickly generate an initial accurate estimation of the skew. Ideally such methods and devices will generate accurate estimates of the skew faster than the use of a Kalman filter.

SUMMARY OF THE INVENTION

An exemplary embodiment of the invention provides a method of estimating a skew value of a local clock in a time client compared with a master clock in a time server, the method including the steps of: exchanging, between the time server and the time client, timing messages and timestamps representing the times of sending and times of receipt of the timing messages; and estimating a skew value of the local clock using a least squares fitting algorithm which minimises a cost function between each data point in a dataset and a zero skew state, wherein each data point in the dataset represents a phase offset of the local clock calculated from the timestamps.

A further exemplary embodiment of the invention provides a time client communicably coupled to a time server over a network, the time client comprising: a local clock; and a control unit; wherein the control unit is configured to: exchange with the time server, timing messages and timestamps representing the times of sending and times of receipt of the timing messages; and estimate a skew value of the local clock using a least squares fitting algorithm which minimises a cost function between each data point in a dataset and a zero skew state, wherein each data point in the dataset represents a phase offset of the local clock calculated from the timestamps.

A further exemplary embodiment of the invention provides a networked time system including a time server and at least one time client communicably coupled to the time server over a network, wherein: the time server includes a master clock and is configured to exchange, with the time client, timing messages and timestamps representing the times of sending and times of receipt of the timing messages; the time client includes a local clock and a control unit; wherein the control unit is configured to: exchange with the time server, timing messages and timestamps representing the times of sending and times of receipt of the timing messages; and estimate a skew value of the local clock using a least squares fitting algorithm which minimises a cost function between each data point in a dataset and a zero skew state, wherein each data point in the dataset represents a phase offset of the local clock calculated from the timestamps.

BRIEF DESCRIPTION OF THE DRAWINGS

Embodiments of the invention will now be described by way of example with reference to the accompanying FIGURE in which:

FIG. 1 shows the calculated instantaneous phase offset of timing messages over the forward and reverse paths between a master and slave, along with the true offset, changing over time.

DETAILED DESCRIPTION

At their broadest, aspects of the present invention provide for methods and devices which obtain an estimate of the skew value of a local clock using a least squares fitting algorithm.

A first aspect of the present invention provides a method of estimating a skew value of a local clock in a time client compared with a master clock in a time server, the method including the steps of: exchanging, between the time server and the time client, timing messages and timestamps representing the times of sending and times of receipt of the timing messages; and estimating a skew value of the local clock using a least squares fitting algorithm which minimises a cost function between each data point in a dataset and a zero skew state, wherein each data point in the dataset represents a phase offset of the local clock calculated from the timestamps.

Preferably the time client and the time server are connected by a network such as a packet network (using technologies such Ethernet, IP, MPLS, etc.).

The timing messages are preferably timing messages under the IEEE 1588 Precision Time Protocol (PTP).

The method of this aspect can generate an initial accurate estimation of the skew using a least squares fitting algorithm. Preferably the algorithm is a non-linear least squares fitting algorithm such as the Levenberg-Marquardt (LM) algorithm.

The initial accurate estimate of the skew can be generated by such an algorithm much faster than a similarly accurate estimate would be obtained by a Kalman filter.

Preferably the method further comprises the step of using the estimated skew value of the local clock as an initial skew value in a method of synchronisation which repeatedly calculates the offset and the skew of the local clock. The provision of an initial skew estimate in this way can allow the synchronisation method to converge to an accurate estimate of the skew and offset much faster than using the synchronisation method alone.

The method of synchronisation may include a Kalman filter process. In such an arrangement, the estimated skew value from the least squares fitting algorithm can be employed by the Kalman filter as its initial skew estimate.

Whilst the methods of this aspect are well-suited to generating an initial skew estimate, they are less well-suited to the continuous updating of the skew and offset estimates. Therefore, the method of synchronization preferably utilises a different algorithm.

The method may further include the step of adjusting the output of the local clock by applying the calculated instantaneous phase offset and instantaneous skew to produce a local clock output which is synchronised with the master clock.

In embodiments of the invention, a previously found skew value may be used as an initial solution in the least squares fitting algorithm. This can improve the accuracy of the skew estimate produced. For example, the fitting algorithm can be run once with an initial solution for the skew of zero. The algorithm can then be run again with a subsequent set of results and using the estimated skew produced in the first run as its initial solution.

In particular embodiments, the step of estimating minimises a first cost function and a second cost function, wherein: the first cost function relates to a forward transmission path corresponding to the transmission of first timing messages from the time server to the time client, and causes the phase offset data point corresponding to the most minimally delayed message among the first timing messages to correspond to an estimated zero skew state for the forward transmission path; and the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

In particular embodiments, the first cost function $f_{Ef}(x,i)$ for the forward transmission path has the form:

$$f_{Ef}(x,i)=\theta_{Ef}[i]-N_f(x,i)-\max\{(\theta_{Ef}[0]-N_f(x,0)); \ldots ;(\theta_{Ef}[i]-N_f(x,i))\};$$

wherein: $\theta_{Ef}[i]=T_1[i]-T_2[i]$ is the measured phase offset corresponding to the forward transmission path at the time of the ith first timing message, where $T_1[i]$ is the timestamp recorded by the time server on sending of the ith first timing message and $T_2[i]$ is the time of receipt as recorded by the time client on receipt of the ith first timing message; x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path; $N_f(x,i)=x(T_1[i]-T_1[0])$ is a normalizing function of the phase offset $\theta_{Ef}[i]$; and the index i relates to a specific window of timing messages and the corresponding timestamps.

In a development of the above embodiments only data points corresponding to a value of $\theta_{Ef}[i]$ which is higher than a running mean of $\theta_{Ef}$ are used in the first cost function $f_{Ef}(x,i)$.

In particular embodiments (which may include the above particular embodiments) the second cost function $f_{Er}(x,i)$ for the reverse transmission path has the form: $f_{Er}(x,i)=\theta_{Er}[i]-N_r(x,i)-\min\{(\theta_{Er}[0]-N_r(x,0)); \ldots ; (\theta_{Er}[i]-N_r(x,i))\}$; wherein: $\theta_{Er}[i]=T_4[i]-T_3[i]$ is the measured phase offset corresponding to the reverse transmission path at the time of the ith second timing message, where $T_3[i]$ is the timestamp recorded by the time client on sending of the ith second timing message and $T_4[i]$ is the time of receipt as recorded by the time server on receipt of the ith second timing message; x is a parameter with respect to which the least squares fitting algorithm minimizes $f_{Er}(x,i)$, where the value of x for which $f_{Er}(x,i)$ is minimized corresponds to the estimated skew value $\alpha_r$ for the reverse transmission path; $N_r(x,i)=x(T_4[i]-T_4[0])$ is a normalizing function of the phase offset $\theta_{Er}[i]$; and the index i relates to a specific window of timing messages and the corresponding timestamps.

In a development of the above embodiments only data points corresponding to a value of $\theta_{Er}[i]$ which is lower than a running mean of $\theta_{Er}$ are used in the second cost function $f_{Er}(x,i)$.

Cost functions of the form set out in the particular embodiments above have been found to be particularly effective in rapidly obtaining an accurate skew estimate. The accuracy of the estimated skew value is critically dependent on the choice of cost function employed by the fitting algorithm.

The goal of the cost functions in the above embodiments is to independently identify the transformations which will normalise the instantaneous forward and reverse phases at each time instant to the ideal (no skew) instantaneous phase such that the cost function is minimised. By selecting a transformation which is a function of the estimated skew value, the estimated skew is readily extracted from the optimised transformations. These cost functions force the fitting algorithm to find an estimated skew which minimizes the distance of all data points from a notional zero skew condition and also ensures that the phase offset data point associated with the most minimally delayed packet in each window corresponds exactly to the zero skew state.

The inventors believe that the cost functions of the above embodiments provide the optimum estimate of the skew.

The skew value of the local clock may be estimated in a number of ways. For example, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and calculating $\alpha$ from an average of $\alpha_f$ and $\alpha_r$. This applies a simple average of the skew value obtained for the forward and reverse paths.

Alternatively a weighted average may be used, for example weighted in accordance with the corresponding minimised cost function. The cost function can serve as a quality of fit factor, i.e. the lower the value of the cost function, the higher the weighting given to a particular component of the skew value.

Alternatively, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and setting $\alpha$ to be the one of $\alpha_f$ and $\alpha_r$ for which the corresponding minimized cost function has the lowest value.

In other embodiments of the present invention the skew value $\alpha$ of the local clock is estimated by: defining a combined cost function which includes both said first cost function and said second cost function; and estimating $\alpha$ by using the least squares fitting algorithm to minimize the combined cost function.

For example, the combined cost function may be defined as:

$$f_E(x, j) = \begin{cases} f_{Ef}(x, j) & \text{for } 0 \leq j < L \\ f_{Er}(x, j-L) & \text{for } L \leq j < 2L \end{cases}$$

where L is the number of respective timing messages of the first and second type sent; and the skew $\alpha$ by using the least squares fitting algorithm to minimize $f_E(x,i)$ with respect to x.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

A second aspect of the present invention provides a time client communicably coupled to a time server over a network, the time client comprising: a local clock; and a control unit; wherein the control unit is configured to: exchange with the time server, timing messages and timestamps representing the times of sending and times of receipt of the timing messages; and estimate a skew value of the local clock using a least squares fitting algorithm which minimises a cost function between each data point in a dataset and a zero skew state, wherein each data point in the dataset represents a phase offset of the local clock calculated from the timestamps.

The network may be a packet network (using technologies such Ethernet, IP, MPLS, etc.).

The timing messages are preferably timing messages under the IEEE 1588 Precision Time Protocol (PTP).

The time client of this aspect can generate an initial accurate estimation of the skew using a least squares fitting algorithm. Preferably the algorithm is a non-linear least squares fitting algorithm such as the Levenberg-Marquardt (LM) algorithm.

The initial accurate estimate of the skew can be generated by such an algorithm much faster than a similarly accurate estimate would be obtained by a Kalman filter.

Preferably the control unit is further configured to use the estimated skew value of the local clock as an initial skew value in a subsequent step of synchronisation which repeatedly calculates the offset and the skew of the local clock. The provision of an initial skew estimate in this way can allow the synchronisation to converge to an accurate estimate of the skew and offset much faster than using the synchronisation method alone.

The synchronisation step may include a Kalman filter process. In such an arrangement, the estimated skew value from the least squares fitting algorithm can be employed by the Kalman filter as its initial skew estimate.

Whilst the fitting algorithms used by the control unit of this aspect are well-suited to generating an initial skew estimate, they are less well-suited to the continuous updating of the skew and offset estimates. Therefore, the synchronization step preferably utilises a different algorithm.

The control unit may be further configured to of adjust the output of the local clock by applying the calculated instantaneous phase offset and instantaneous skew to produce a local clock output which is synchronised with the master clock.

In embodiments of the invention, a previously found skew value may be used as an initial solution in the least squares fitting algorithm. This can improve the accuracy of the skew estimate produced. For example, the fitting algorithm can be run once with an initial solution for the skew of zero. The algorithm can then be run again with a subsequent set of results and using the estimated skew produced in the first run as its initial solution.

In particular embodiments, the control unit is configured to estimate said skew value by minimising a first cost function and a second cost function, wherein: the first cost function relates to a forward transmission path corresponding to the transmission of first timing messages from the time server to the time client and causes the phase offset data point corresponding to the most minimally delayed message among the first timing messages to correspond to an estimated zero skew state for the forward transmission path; and the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

In particular embodiments, the first cost function $f_{Ef}(x,i)$ for the forward transmission path has the form:

$$f_{Ef}(x,i) = \theta_{Ef}[i] - N_f(x,i) - \max\{(\theta_{Ef}[0] - N_f(x,0)); \ldots ; (\theta_{Ef}[i] - N_f(x,i))\};$$

wherein: $\theta_{Ef}[i] = T_1[i] - T_2[i]$ is the measured phase offset corresponding to the forward transmission path at the time of the ith first timing message, where $T_1[i]$ is the timestamp recorded by the time server on sending of the ith first timing message and $T_2[i]$ is the time of receipt as recorded by the time client on receipt of the ith first timing message; x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path; $N_f(x,i) = x(T_1[i] - T_1[0])$ is a normalizing function of the phase offset $\theta_{Ef}[i]$; and the index i relates to a specific window of timing messages and the corresponding timestamps.

In a development of the above embodiments only data points corresponding to a value of $\theta_{Ef}[i]$ which is higher than a running mean of $\theta_{Ef}$ are used in the first cost function $f_{Ef}(x,i)$.

In particular embodiments (which may include the above particular embodiments) the second cost function $f_{Er}(x,i)$ for the reverse transmission path has the form: $f_{Er}(x,i) = \theta_{Er}[i] - N_r(x,i) - \min\{(\theta_{Er}[0] - N_r(x,0)); \ldots ; (\theta_{Er}[i] - N_r(x,i))\}$; wherein: $\theta_{Er}[i] = T_4[i] - T_3[i]$ is the measured phase offset corresponding to the reverse transmission path at the time of the ith second timing message, where $T_3[i]$ is the timestamp recorded by the time client on sending of the ith second timing message and $T_4[i]$ is the time of receipt as recorded by the time server on receipt of the ith second timing message; x is a parameter with respect to which the least squares fitting algorithm minimizes $f_{Er}(x,i)$, where the value of x for which $f_{Er}(x,i)$ is minimized corresponds to the estimated skew value $\alpha_r$ for the reverse transmission path; $N_r(x,i)=x(T_4[i]-T_4[0])$ is a normalizing function of the phase offset $\theta_{Er}[i]$; and the index i relates to a specific window of timing messages and the corresponding timestamps.

In a development of the above embodiments only data points corresponding to a value of $\theta_{Er}[i]$ which is lower than a running mean of $\theta_{Er}$ are used in the second cost function $f_{Er}(x,i)$.

Cost functions of the form set out in the particular embodiments above have been found to be particularly effective in rapidly obtaining an accurate skew estimate. The accuracy of the estimated skew value is critically dependent on the choice of cost function employed by the fitting algorithm.

The goal of the cost functions in the above embodiments is to independently identify the transformations which will normalise the instantaneous forward and reverse phases at each time instant to the ideal (no skew) instantaneous phase such that the cost function is minimised. By selecting a transformation which is a function of the estimated skew value, the estimated skew is readily extracted from the optimised transformations. These cost functions force the fitting algorithm to find an estimated skew which minimizes the distance of all data points from a notional zero skew condition and also ensures that the phase offset data point associated with the most minimally delayed packet in each window corresponds exactly to the zero skew state.

The inventors believe that the cost functions of the above embodiments provide the optimum estimate of the skew.

The skew value of the local clock may be estimated in a number of ways. For example, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and calculating $\alpha$ from an average of $\alpha_f$ and $\alpha_r$. This applies a simple average of the skew value obtained for the forward and reverse paths.

Alternatively a weighted average may be used, for example weighted in accordance with the corresponding minimised cost function. The cost function can serve as a quality of fit factor, i.e. the lower the value of the cost function, the higher the weighting given to a particular component of the skew value.

Alternatively, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and setting $\alpha$ to be the one of $\alpha_f$ and $\alpha_r$ for which the corresponding minimized cost function has the lowest value.

In other embodiments of the present invention the control unit is configured to estimate the skew value $\alpha$ of the local clock is estimated by: defining a combined cost function which includes both said first cost function and said second cost function; and estimating $\alpha$ by using the least squares fitting algorithm to minimize the combined cost function.

For example, the combined cost function may be defined as:

$$f_E(x, j) = \begin{cases} f_{Ef}(x, j) & \text{for } 0 \le j < L \\ f_{Er}(x, j-L) & \text{for } L \le j < 2L \end{cases}$$

where L is the number of respective timing messages of the first and second type sent; and the skew $\alpha$ by using the least squares fitting algorithm to minimize $f_E(x,i)$ with respect to x.

The time client of the present aspect may include any combination of some, all or none of the above described preferred and optional features.

The control unit of the time client of the above aspect preferably operates by performing a method according to the first aspect of this invention, as described above, but need not do so.

A further aspect of the present invention provides a networked time system including a time server and at least one time client communicably coupled to the time server over a network, wherein: the time server includes a master clock and is configured to exchange, with the time client, timing messages and timestamps representing the times of sending and times of receipt of the timing messages; the time client includes a local clock and a control unit; wherein the control unit is configured to: exchange with the time server, timing messages and timestamps representing the times of sending and times of receipt of the timing messages; and estimate a skew value of the local clock using a least squares fitting algorithm which minimises a cost function between each data point in a dataset and a zero skew state, wherein each data point in the dataset represents a phase offset of the local clock calculated from the timestamps.

The network may be a packet network (using technologies such Ethernet, IP, MPLS, etc.).

The timing messages are preferably timing messages under the IEEE 1588 Precision Time Protocol (PTP).

The time client of this aspect can generate an initial accurate estimation of the skew using a least squares fitting algorithm. Preferably the algorithm is a non-linear least squares fitting algorithm such as the Levenberg-Marquardt (LM) algorithm.

The initial accurate estimate of the skew can be generated by such an algorithm much faster than a similarly accurate estimate would be obtained by a Kalman filter.

Preferably the control unit is further configured to use the estimated skew value of the local clock as an initial skew value in a subsequent step of synchronisation which repeatedly calculates the offset and the skew of the local clock. The provision of an initial skew estimate in this way can allow the synchronisation to converge to an accurate estimate of the skew and offset much faster than using the synchronisation method alone.

The synchronisation step may include a Kalman filter process. In such an arrangement, the estimated skew value from the least squares fitting algorithm can be employed by the Kalman filter as its initial skew estimate.

Whilst the fitting algorithms used by the control unit of this aspect are well-suited to generating an initial skew estimate, they are less well-suited to the continuous updating of the skew and offset estimates. Therefore, the synchronization step preferably utilises a different algorithm.

The control unit may be further configured to adjust the output of the local clock by applying the calculated instantaneous phase offset and instantaneous skew to produce a local clock output which is synchronised with the master clock.

In embodiments of the invention, a previously found skew value may be used as an initial solution in the least squares fitting algorithm. This can improve the accuracy of the skew estimate produced. For example, the fitting algorithm can be run once with an initial solution for the skew of zero. The algorithm can then be run again with a subsequent set of results and using the estimated skew produced in the first run as its initial solution.

In particular embodiments, the control unit is configured to estimate said skew value by minimising a first cost function and a second cost function, wherein: the first cost function relates to a forward transmission path corresponding to the transmission of first timing messages from the time server to the time client and causes the phase offset data point corresponding to the most minimally delayed message among the first timing messages to correspond to an estimated zero skew state for the forward transmission path; and the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

In particular embodiments, the first cost function $f_{Ef}(x,i)$ for the forward transmission path has the form:

$$f_{Ef}(x,i) = \theta_{Ef}[i] - N_f(x,i) - \max\{(\theta_{Ef}[0] - N_f(x,0)); \ldots ;(\theta_{Ef}[i] - N_f(x,i))\};$$

wherein: $\theta_{Ef}[i] = T_1[i] - T_2[i]$ is the measured phase offset corresponding to the forward transmission path at the time of the ith first timing message, where $T_1[i]$ is the timestamp recorded by the time server on sending of the ith first timing message and $T_2[i]$ is the time of receipt as recorded by the time client on receipt of the ith first timing message; x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path; $N_f(x,i) = x(T_1[i] - T_1[0])$ is a normalizing function of the phase offset $\theta_{Ef}[i]$; and the index i relates to a specific window of timing messages and the corresponding timestamps.

In a development of the above embodiments only data points corresponding to a value of $\theta_{Ef}[i]$ which is higher than a running mean of $\theta_{Ef}$ are used in the first cost function $f_{Ef}(x,i)$.

In particular embodiments (which may include the above particular embodiments) the second cost function $f_{Er}(x,i)$ for the reverse transmission path has the form: $f_{Er}(x,i) = \theta_{Er}[i] - N_r(x,i) - \min\{\theta_{Er}[0] - N_r(x,0)); \ldots ; (\theta_{Er}[i] - N_r(x,i))\}$; wherein: $\theta_{Er}[i] = T_4[i] - T_3[i]$ is the measured phase offset corresponding to the reverse transmission path at the time of the ith second timing message, where $T_3[i]$ is the timestamp recorded by the time client on sending of the ith second timing message and $T_4[i]$ is the time of receipt as recorded by the time server on receipt of the ith second timing message; x is a parameter with respect to which the least squares fitting algorithm minimizes $f_{Er}(x,i)$, where the value of x for which $f_{Er}(x,i)$ is minimized corresponds to the estimated skew value $\alpha_r$ for the reverse transmission path; $N_r(x,i) = x(T_4[i] - T_4[0])$ is a normalizing function of the phase offset $\theta_{Er}[i]$; and the index i relates to a specific window of timing messages and the corresponding timestamps.

In a development of the above embodiments only data points corresponding to a value of $\theta_{Er}[i]$ which is lower than a running mean of $\theta_{Er}$ are used in the second cost function $f_{Er}(x,i)$.

Cost functions of the form set out in the particular embodiments above have been found to be particularly effective in rapidly obtaining an accurate skew estimate. The accuracy of the estimated skew value is critically dependent on the choice of cost function employed by the fitting algorithm.

The goal of the cost functions in the above embodiments is to independently identify the transformations which will normalise the instantaneous forward and reverse phases at each time instant to the ideal (no skew) instantaneous phase such that the cost function is minimised. By selecting a transformation which is a function of the estimated skew value, the estimated skew is readily extracted from the optimised transformations. These cost functions force the fitting algorithm to find an estimated skew which minimizes the distance of all data points from a notional zero skew condition and also ensures that the phase offset data point associated with the most minimally delayed packet in each window corresponds exactly to the zero skew state.

The inventors believe that the cost functions of the above embodiments provide the optimum estimate of the skew.

The skew value of the local clock may be estimated in a number of ways. For example, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and calculating $\alpha$ from an average of $\alpha_f$ and $\alpha_r$. This applies a simple average of the skew value obtained for the forward and reverse paths.

Alternatively a weighted average may be used, for example weighted in accordance with the corresponding minimised cost function. The cost function can serve as a quality of fit factor, i.e. the lower the value of the cost function, the higher the weighting given to a particular component of the skew value.

Alternatively, the skew value $\alpha$ of the local clock may be estimated by: estimating the skew value $\alpha_f$ for the forward transmission path by using the least squares fitting algorithm to minimize the first cost function; estimating the skew value $\alpha_r$ for the reverse transmission path by using the least squares fitting algorithm to minimize the second cost function; and setting $\alpha$ to be the one of $\alpha_f$ and $\alpha_r$ for which the corresponding minimized cost function has the lowest value.

In other embodiments of the present invention the control unit is configured to estimate the skew value $\alpha$ of the local clock is estimated by: defining a combined cost function which includes both said first cost function and said second cost function; and estimating $\alpha$ by using the least squares fitting algorithm to minimize the combined cost function.

For example, the combined cost function may be defined as:

$$f_E(x, j) = \begin{cases} f_{Ef}(x, j) & \text{for } 0 \le j < L \\ f_{Er}(x, j - L) & \text{for } L \le j < 2L \end{cases}$$

where L is the number of respective timing messages of the first and second type sent; and the skew $\alpha$ by using the least squares fitting algorithm to minimize $f_E(x,i)$ with respect to x.

The system of the present aspect may include any combination of some, all or none of the above described preferred and optional features.

The processor of the slave device of the above aspect preferably operates by performing a method according to the second aspect of this invention, as described above, but need not do so.

An essential part of a time & frequency synchronization system operating over packet networks is the ability to estimate the frequency relationship between the master and slave clocks at any point in time. This relationship is referred to as the clock skew (or fractional frequency offset).

To generate an up to date estimate of the skew, an estimation technique, such as Kalman filtering, or some other suitable technique, is usually employed. However, such estimation techniques can take a significant length of time to converge. The rate of convergence of most estimation algorithms can be dramatically improved by providing the algorithm with an accurate initial skew estimate.

Embodiments of the present invention provide techniques which generate an accurate initial estimate skew estimate which can then be used in the conventional estimation technique.

In embodiments of the present invention, the initial skew estimate, along with an estimate of the instantaneous phase offset, is derived from a set of timestamps $T_1$, $T_2$, $T_3$, $T_4$ using a non-linear least squares-fitting algorithm which, in specific embodiments, is the Levenberg-Marquardt algorithm. The timestamps $T_1$, $T_2$, $T_3$, $T_4$ are the standard time-stamps obtained from an exchange of timing messages between a master and a slave device, for example using the IEEE 1588 Precision Time Protocol (PTP), and represent, respectively, the time of sending of a first timing message from the master to the slave, the time of receipt of the first timing message at the slave, the time of sending of a second timing message from the slave to the master and the time of receipt of the second timing message at the slave.

The relationship between the instantaneous phase offset and timestamps $T_1$, $T_2$, $T_3$, and $T_4$ is defined as follows:

$$T_1[n]+q_f[n]+d_f=T_2[n]+\theta_T[n] \quad \text{1a}$$

$$T_4[n]-q_r[n]-d_r=T_3[n]+\theta_T[n] \quad \text{1b}$$

The contributions to the overall instantaneous phase offset from the forward and reverse paths are defined as:

$$\theta_{Ef}[n] = T_1[n] - T_2[n] = \theta_T[n] - q_f[n] - d_f \quad \text{2a}$$

$$\theta_{Er}[n] = \underbrace{T_4[n] - T_3[n]}_{\text{measured}} = \underbrace{\theta_T[n]}_{\substack{\text{true}\\\text{offset}}} + \underbrace{q_r[n]}_{\text{noise}} + \underbrace{d_r}_{\substack{\text{static}\\\text{bias}}} \quad \text{2b}$$

Using a standard model of the clock (physical oscillator), a relationship can be defined between consecutive discrete moments of the instantaneous phase offset as follows:

$$\theta[n]=\theta[n-1]+\alpha[n-1]\Delta T[n] \quad 3$$

That is, the instantaneous phase offset monotonically grows with time, and the size of the increment $\Delta\theta=\theta[n]-\theta[n-1]$ is governed only by the sampling period $\Delta T$ and the clock skew, $\alpha$. FIG. 1 illustrates the effect of the clock skew on the forward and reverse instantaneous phase offsets.

Note that it follows from equation 3 that in the case there is no skew ($\alpha=0$) the instantaneous phase offset would be constant as depicted by the dotted line in FIG. 1.

It is known that the problem of finding the skew value can be solved by a number of methods each having different complexity and robustness. An example of a simple, but not a very robust method is a linear regression (a simple affine function fitting). This is quite simple (and therefore computationally efficient) to compute, but the result is sensitive to outliers and noise distribution asymmetries (e.g. traffic load asymmetry on the forward and reverse paths). An example of a more robust, but very complex and computationally inefficient method, is linear programming which converges to an optimal solution.

The approach of the embodiments described below is to solve the problem optimally (like linear programming), but much more efficiency, by mixing the two approaches, i.e., a combination of function fitting and optimality of linear programming using the Levenberg-Marquardt (LM) algorithm [1]. Note that instead of the LM algorithm a number of other least squares fitting algorithms can be used, such as gradient methods (Gradient Descent (steepest descent), Newton's method, Gauss-Newton's methods), QR & Singular Value Decomposition methods, direct search methods (Nelder-Mead search). In general, it could be any least squares fitting algorithm that solves a problem defined by a proprietary cost function, such as the one defined below by equations 4-7.

The LM algorithm is used to find an estimated skew value from a set of data points such that the chosen cost function is minimized. The goal that is set for the LM algorithm is to find a transformation function, which when applied to each data point, minimizes the cost function between each data point and the ideal instantaneous phase offset. The skew can then be estimated from the transformation function.

The choice of cost function has a direct impact on the type of data transformation that is selected and is critical to how well the system performs. It is believed that the cost function described below and used in embodiments of the present invention provides an optimum solution.

For the fitting problem in general (regardless of the fitting algorithm used), as followed here, the cost function is defined as:

$$f(x,i)=y(i)-M(x,t_i) \quad \text{4a}$$

where y(i) are the observed/measured data to be fitted, M is the function model, x is a vector of parameters being estimated by a fitting algorithm, and $t_i$ are the time instants at which the model M should fit the values y(i). Note that the LM algorithm minimizes equation 4a in a least squares manner, that is, by finding x, a local minimizer for:

$$F(x)=\Sigma_{i=0}^{m}[f(x,i)]^2 \quad \text{4b}$$

For the present purposes, a cost function, such as the one in equation 4a, is required that enables the skew parameter to be estimated in the optimal way (similar to a linear programming approach).

Given equation 3, if a skew estimate can be found which is very close to the true skew, a 'normalizing' function can be found which if subtracted from the instantaneous phase offset will provide a constant instantaneous phase offset as indicated by the horizontal dotted lines in the FIG. 1.

Thus, for a window of L samples indexed by variable k (i.e. k runs from 0 to L−1), we can describe such a normalizing function N, as a function of the skew estimate $\hat{\alpha}$ and discrete step k as follows:

$$N_f(\hat{\alpha}, k) = \sum_{j=1}^{k} \hat{\alpha}\Delta T_1[j]$$

$$N_r(\hat{\alpha}, k) = \sum_{j=1}^{k} \hat{\alpha} \Delta T_4[j]$$

hence the constant or normalized instantaneous phase offset $\hat{\theta}_{Ef}$, $\hat{\theta}_{Er}$ would be:

$$\hat{\theta}_{Ef}[k] = \theta_{Ef}[k] - N_f(\hat{\alpha}, k) \qquad 5a$$

$$\hat{\theta}_{Er}[k] = \theta_{Ef}[k] - N_r(\hat{\alpha}, k) \qquad 5b$$

Based on the equations 5a and 5b above, a simple choice of cost function, though not optimal, could be:

$$f_{Ef}(x, i) = \theta_{Ef}[i] - N_f(x, i) \qquad 6a$$

$$f_{Er}(x, i) = \theta_{Er}[i] - N_r(x, i) \qquad 6b$$

where x is the parameter being estimated by a fitting algorithm (LM), i.e., clock skew α, and i is the sample index. This solution is basically a type of linear regression and thus, inevitably, sensitive to the outliers in the data.

From FIG. 1, and knowledge of the physical system, an optimum solution can be found when the measured normalized data points are distributed above the notional horizontal line (that marks ideal instantaneous phase offset) for $\theta_{Er}$ and the instantaneous phase offset corresponding to the most minimally delay packet is located on the notional horizontal line. This will also be true for the forward direction, except that that the normalized data points must be below the line for $\theta_{Ef}$. This can be translated in mathematical terms to a cost function as follows:

$$f_{Ef}(x, i) = \theta_{Ef}[i] - N_f(x, i) - \max\{\theta_{Ef}[i] - N_f(x, i)\} \qquad 7a$$

$$f_{Er}(x, i) = \theta_{Ef}[i] - N_r(x, i) - \min\{\theta_{Ef}[i] - N_r(x, i)\} \qquad 7b$$

This cost function forces the LM algorithm to find an estimated skew which minimizes the distance of all data points from the notional horizontal line (zero skew) and also ensures that phase offset corresponding to the most minimally delayed packet is located on the no skew line. Hence, effectively in the process, the skew estimate $\hat{\alpha}$ is discovered, which is as close to the true α as possible, given the data in the current window.

Whilst the LM algorithm is ideal for generating the initial skew estimate, it is not as well suited to the continuous updating of the skew and instantaneous phase offset estimates. The LM algorithm requires many less samples (which translates directly to less time) compared to, for example, a Kalman filter approach, to find an initial accurate skew estimate. The LM algorithm also has relatively low computational complexity. However, a Kalman filter is overall much more computationally efficient, especially when executing using only a few minimally delayed packets. If the LM algorithm was operated continuously it would find the same minimally delayed packets, but it would require much more computation to do so. Hence the preferred approach according to the present embodiment is to use the LM algorithm to find an initial skew estimate, calculate the initial instantaneous phase offset using the minimally delayed packets and then operate a Kalman filter thereafter. Due to the precision of the estimated skew that can be derived from the use of the LM algorithm, accurate minimally delayed packets are available to the Kalman filter from the start.

In various embodiments of the present invention, further enhancements of the general embodiment above may be made as set out below. These enhancements may be adopted individually or collectively in embodiments of the invention.

The number of iterations needed to find the optimal solution can be significantly reduced by using a previously found skew value as an initial solution $x_0$ to the LM algorithm. For instance, the first run of the LM algorithm may be initialized with $x_0$ set to zero. The LM algorithm then finds the clock skew $\hat{\alpha}_0$, and for the next window the LM algorithm is initialized with skew estimate from previous window, i.e., $x_0 = \hat{\alpha}_0$.

The number of data points used in equations 7a and 7b above can be reduced by data selection prior to passing them to the LM algorithm. For example, only data points which are above (for $\theta_{Ef}$) and below (for $\theta_{Er}$) the running mean of $\theta_{Ef}$, $\theta_{Er}$ respectively add new information. The running mean can, for example, be implemented as a simple exponentially weighted moving average filter with a time constant τ set to 100.

Equations 7a and 7b can be computed separately or combined into one cost function. When computed separately, two clock skew estimates are obtained, whereas only one is obtained if there is a single cost function. Different methods can be used to combine the two clock skew estimates.

For example, a simple average, i.e., $\hat{\alpha} = (\hat{\alpha}_f + \hat{\alpha}_r)/2$ may be used.

Alternatively a weighted average, e.g.:

$$\hat{\alpha} = \left( \frac{1}{f_{Ef}(\hat{\alpha}_f)} \hat{\alpha}_f + \frac{1}{f_{Er}(\hat{\alpha}_r)} \hat{\alpha}_r \right) \Big/ \left( \frac{1}{f_{Ef}(\hat{\alpha}_f)} + \frac{1}{f_{Er}(\hat{\alpha}_r)} \right),$$

where $f_{Ef}(\hat{\alpha}_f)$ and $f_{Er}(\hat{\alpha}_r)$ are derived from equations 7a and 7b respectively, and can serve as the quality of fitness factor. It can be seen that the better the fit, i.e., lower value of the cost function, the higher the weighting factor.

Alternatively, one skew estimate may be selected from those available, based on the cost function. For example, the skew estimate with lower cost function (from either the forward or reverse direction) is selected.

The forward and reverse cost functions may both be included in a combined LM estimation algorithm. For example the above cost functions 7a and 7b could be combined together into a set:

$$f_{Ef}(x, j) = \begin{cases} f_{Ef}(x, j) \dots 0 \le j < L \\ f_{Er}(x, j - L) \dots L \le j < 2L \end{cases}$$

where L is the length of the window used for LM algorithm.

The two following terms: $\max\{\theta_{Ef}[i] - N_f(x, i)\}$ and $\min\{\theta_{Er}[i] - N_r(x, i)\}$ can be used to provide the optimal instantaneous phase offset measurements and used in the Kalman filter.

Whilst the approaches set out above work with any number of samples, longer time windows (i.e. more samples) provide more confidence in the skew estimation accuracy and precision.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] Gavin, H. P.: The Levenberg-Marquardt method for nonlinear least squares curve-fitting problems. On-line: http://people.duke.edu/~hpgavin/ce281/lm.pdf.9 Mar. 2016

All references referred to above are hereby incorporated by reference.

The systems and methods herein can be used in the various systems and methods described in related cases: U.S. Pat. No. 8,959,381 (Ref. No. SXH/FP6829600), copending U.S. patent application Ser. No. 15/088,468 (SXH/FP7140452), filed 1 Apr. 2016, and copending U.S. patent application Ser. No. 15/053,393, filed 25 Feb. 2016 (Ref. No. SXH/FP7113616), the entire contents of which are all incorporated by reference in their entireties as though fully recited herein. Those skilled in the art will understand how to use the clock skew calculations of this applications in the systems and methods incorporated by reference based on the teachings herein and the teachings in the documents being incorporated by reference.

The invention claimed is:

1. A method of estimating a skew value of a local clock in a time client compared with a master clock in a time server, the method including the steps of:

exchanging, between the time server and the time client, timing messages and timestamps representing the times of sending and times of receipt of the timing messages;

determining a phase offset data point in a dataset; and estimating a skew value of the local clock using a least squares fitting algorithm which minimizes a distance between the determined phase offset data point in the dataset and a zero skew state using a cost function, wherein each data point in the dataset represents a phase offset of the local clock calculated from the timestamps;

wherein the estimated skew value of the local clock is used as an initial skew value in a method of synchronization which repeatedly calculates the offset and the skew of the local clock; and wherein the determined phase offset data point corresponds to a most minimally delayed timing message.

2. A method of estimating a skew value of a local clock in a time client compared with a master clock in a time server, the method including the steps of:

exchange, between the time server and the time client, timing messages and timestamps representing the times of sending and times of receipt of the timing messages; and estimating a skew value of the local clock using a least squares fitting algorithm which minimizes a cost function between each data point in a dataset and a zero skew state, wherein each data point in the dataset represents a phase offset of the local cock calculated from the timestamps;

wherein the step of estimating minimizes a first cost function and a second cost function, wherein:

the first cost function relates to a forward transmission path corresponding to the transmission of first timing messages from the time server to the time client, and causes the phase offset data point corresponding to the most minimally delayed message among the first timing messages to correspond to an estimated zero skew state for the forward transmission path; and the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

3. The method according to claim 2, wherein the first cost function $f_{Ef}(x,i)$ for the forward transmission path has the form:

$$f_{Ef}(x,i) = \theta_{Ef}[i] - N_f(x,i) - \max\{(\theta_{Ef}[0] - N_f(x,0)); \ldots ; (\theta_{Ef}[i] - N_f(x,i))\};$$

wherein:

$\theta_{Ef}[i] = T_1[i] - T_2[i]$ is the measured phase offset corresponding to the forward transmission path at the time of the ith first timing message, where $T_1[i]$ is the timestamp recorded by the time server on sending of the ith first timing message and $T_2[i]$ is the time of receipt as recorded by the time client on receipt of the ith first timing message;

x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path;

$N_f(x,i) = x(T_1[i] - T_1[0])$ is a normalizing function of the phase offset $\theta_{Ef}[i]$; and the index i relates to a specific window of timing messages and the corresponding timestamps.

4. The method according to claim 3, wherein only data points corresponding to a value of $\theta_{Ef}[i]$ which is higher than a running mean of $\theta_{Ef}$ are used in the first cost function $f_{Ef}(x,i)$.

5. The method according to claim 2, wherein the second cost function $f_{Er}(x,i)$ for the reverse transmission path has the form:

$$f_{Er}(x,i) = \theta_{Er}[i] - N_r(x,i) - \min\{(\theta_{Er}[0] - N_r(x,0)); \ldots ; (\theta_{Er}[i] - N_r(x,i))\};$$

wherein:

$\theta_{Er}[i] = T_4[i] - T_3[i]$ is the measured phase offset corresponding to the reverse transmission path at the time of the ith second timing message, where $T_3[i]$ is the timestamp recorded by the time client on sending of the ith second timing message and $T_4[i]$ is the time of receipt as recorded by the time server on receipt of the Ith second timing message;

x is a parameter with respect to which the least squares fitting algorithm minimizes $f_{Er}(x,i)$, where the value of x for which $f_{Er}(x,i)$ is minimized corresponds to the estimated skew value $\alpha_r$ for the reverse transmission path;

$N_r(x,i) = x(T_4[i] - T_4[0])$ is a normalizing function of the phase offset $\theta_{Er}[i]$; and the index i relates to a specific window of timing messages and the corresponding timestamps.

6. The method according to claim 5, wherein only data points corresponding to a value of $\theta_{Er}[i]$ which is lower than a running mean of $\theta_{Er}$ are used in the second cost function $f_{Er}(x,i)$.

7. The method according to claim 2, wherein the skew value $\alpha$ of the local clock is estimated by:

estimating the skew value $\alpha_f$ for the forward transmission path by using the least squares fitting algorithm to minimize the first cost function;

estimating the skew value $\alpha_r$ for the reverse transmission path by using the least squares fitting algorithm to minimize the second cost function; and calculating $\alpha$ from an average of $\alpha_f$ and $\alpha_r$.

8. The method according to claim 2, wherein the skew value $\alpha$ of the local clock is estimated by:

estimating the skew value $\alpha_f$ for the forward transmission path by using the least squares fitting algorithm to minimize the first cost function;

estimating the skew value $\alpha_r$ for the reverse transmission path by using the least squares fitting algorithm to minimize the second cost function; and setting $\alpha$ to be the one of $\alpha_f$ and $\alpha_r$ for which the corresponding minimized cost function has the lowest value.

9. The method according to claim 2, wherein the skew value $\alpha$ of the local clock is estimated by:

defining a combined cost function which includes both said first cost function and said second cost function; and estimating $\alpha$ by using the least squares fitting algorithm to minimize the combined cost function.

10. A time client communicably coupled to a time server over a network, the time client comprising:

a local clock; and a control unit;

wherein the control unit is configured to:

exchange with the time server, timing messages and timestamps representing the times of sending and times of receipt of the timing messages;

determining a phase offset data point in a dataset; and estimate a skew value of the local clock using a least squares fitting algorithm which minimizes a distance between the determined phase offset data point in the dataset and a zero skew state using a cost function, wherein each data point in the dataset represents a phase offset of the local clock calculated from the timestamps;

wherein the control unit is further configured to use the estimated skew value of the local clock as an initial skew value in a method of synchronisation which repeatedly calculates the offset and the skew of the local clock; and wherein the determined phase offset data point corresponds to a most minimally delayed time message.

11. A time client communicably couples to a time server over a network, the time client comprising:

a local clock; and a control unit;

wherein the control unit is configured to:

exchange with the time server, timing messages and timestamps representing the times of sending and times of receipt of the timing messages; and estimate a skew value of the local clock using a least squares fitting algorithm which minimizes a cost function between each data point in a dataset and a zero skew state, wherein each data point in the dataset represents a phase offset of the local clock calculated from the timestamps; and wherein the control unit is configured to estimate said skew value by minimizing a first cost function and a second cost function, wherein:

the first cost function relates to a forward transmission path corresponding to the transmission of first timing messages from the time server to the time client and causes the phase offset data point corresponding to the most minimally delayed message among the first timing messages to correspond to an estimated zero skew state for the forward transmission path; and the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

12. The time client according to claim 11, wherein the first cost function $f_{Ef}(x,i)$ for the forward transmission path has the form:

$$f_{Ef}(i) = \theta_{Ef}[i] - N(x,i) - \max\{(\theta_{Ef}[0] - N_f(x,0)); \ldots ; (\theta_{Ef}[i] - N_f(x,i))\};$$

wherein:

$\theta_{Ef}[i] = T_1[i] - T_2[i]$ is the measured phase offset corresponding to the forward transmission path at the time of the ith first timing message, where $T_1[i]$ is the timestamp recorded by the time server on sending of the ith first timing message and $T_2[i]$ is the time of receipt as recorded by the time client on receipt of the Ith first timing message;

x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path;

$N_f(x,i) = x(T_1[i] - T_1[0])$ is a normalizing function of the phase offset $\theta_{Ef}[i]$; and the index i relates to a specific window of timing messages and the corresponding timestamps.

13. The time client according to claim 12, wherein only data points corresponding to a value of $\theta_{Ef}[i]$ which is higher than a running mean of $\theta_{Ef}$ are used in the first cost function $f_{Ef}(x,i)$.

14. The time client according to claim 11, wherein the second cost function $f_{Er}(x,i)$ for the reverse transmission path has the form:

$$f_{Er}(x,i)=\theta_{Er}[i]-N_r(x,i)-\min\{(\theta_{Er}[0]-N_r(x,0));\ldots;(\theta_{Er}[i]-N_r(x,i))\};$$

wherein:
$\theta_{Er}[i]=T_4[i]-T_3[i]$ is the measured phase offset corresponding to the reverse transmission path at the time of the ith second timing message, where $T_3[i]$ is the timestamp recorded by the time client on sending of the ith second timing message and $T_4[i]$ is the time of receipt as recorded by the time server on receipt of the ith second timing message;
x is a parameter with respect to which the least squares fitting algorithm minimizes $f_{Er}(x,i)$, where the value of x for which $f_{Er}(x,i)$ is minimized corresponds to the estimated skew value $\alpha_r$ for the reverse transmission path;
$N_r(x,i)=x(T_4[i]-T_4[0])$ is a normalizing function of the phase offset $\theta_{Er}[i]$; and
the index i relates to a specific window of timing messages and the corresponding timestamps.

15. The time client according to claim 14, wherein only data points corresponding to a value of $\theta_{Er}[i]$ which is lower than a running mean of $\theta_{Er}$ are used in the second cost function $f_{Er}(x,i)$.

16. The time client according to claim 11, wherein the control unit is configured to estimate the skew value $\alpha$ of the local clock by:
estimating the skew value $\alpha_f$ for the forward transmission path by using the least squares fitting algorithm to minimize the first cost function;
estimating the skew value $\alpha_r$ for the reverse transmission path by using the least squares fitting algorithm to minimize the second cost function; and
calculating $\alpha$ from an average of $\alpha_f$ and $\alpha_r$.

17. The time client according to claim 11, wherein the control unit is configured to estimate the skew value $\alpha$ of the local clock by:
estimating the skew value $\alpha_f$ for the forward transmission path by using the least squares fitting algorithm to minimize the first cost function;
estimating the skew value $\alpha_r$ for the reverse transmission path by using the least squares fitting algorithm to minimize the second cost function; and
setting $\alpha$ to be the one of $\alpha_f$ and $\alpha_r$ for which the corresponding minimized cost function has the lowest value.

18. The time client according to claim 11, wherein the control unit is configured to estimate the skew value $\alpha$ of the local clock by:
defining a combined cost function which includes both said first cost function and said second cost function; and
estimating $\alpha$ by using the least squares fitting algorithm to minimize the combined cost function.

19. A networked time system including a time server and at least one time client communicably coupled to the time server over a network, wherein:

the time server includes a master clock and is configured to exchange, with the time client, timing messages and timestamps representing the times of sending and times of receipt of the timing messages;
the time client includes a local clock and a control unit;
wherein the control unit is configured to:
exchange with the time server, timing messages and timestamps representing the times of sending and times of receipt of the timing messages;
determining a phase offset data point in a dataset; and
estimate a skew value of the local clock using a least squares fitting algorithm which minimizes a distance between the determined phase offset data point in the dataset and a zero skew state using a cost function, wherein each data point in the dataset represents a phase offset of the local clock calculated from the timestamps;
wherein the control unit is further configured to use the estimated skew value of the local clock as an initial skew value in a method of synchronisation which repeatedly calculates the offset and the skew of the local clock; and
wherein the determined phase off-set data point corresponds to a most minimally delayed timing message.

20. A networked time system including a time server and at least one time client communicably coupled to the time server over a network, wherein:
the time server includes a master clock and is configured to exchange, with the time client, timing messages and timestamps representing the times of sending and times of receipt of the timing messages;
the time client includes a local clock and a control unit:
wherein the control unit is configured to:
exchange ith the time server, timing messages and timestamps representing the times of sending and times of receipt of the timing messages; and
estimate a skew value of the local clock using a least squares fitting algorithm which minimizes a cost function between each data point in a dataset and a zero skew state, wherein each data point in the dataset represents a phase offset of the local clock calculated from the timestamps,
wherein the control unit is configured to estimate said skew value by minimizing a first cost function and a second cost function, wherein:
the first cost function relates to a forward transmission path corresponding to the transmission of first timing messages from the time server to the time client, and causes the phase offset data point corresponding to the most minimally delayed message among the first timing messages to correspond to an estimated zero skew state for the forward transmission path; and
the second cost function relates to a reverse transmission path corresponding to the transmission of second timing messages from the time client to the time server, and causes the phase offset data point corresponding to the most minimally delayed message among the second timing messages to correspond to an estimated zero skew state for the reverse transmission path.

21. The networked time system according to claim 20, wherein the first cost function $f_{Ef}(x,i)$ for the forward transmission path has the form:

$$f_{Ef}(x,i)=\theta_{Ef}[i]-N_f(x,i)-\max\{(\theta_{Ef}[0]-N_f(x,0));\ldots;(\theta_{Ef}[i]-N_f(x,i))\};$$

wherein:

$\theta_{Ef}[i]=T_1[i]-T_2[i]$ is the measured phase offset corresponding to the forward transmission path, where $T_1[i]$ is the timestamp recorded by the time server on sending of the Ith timing message of the first type and $T_2[i]$ is the time of receipt as recorded by the time client on receipt of the Ith timing message of the first type;

x is a parameter with respect to which the least squares fitting algorithm minimizes $f_{Ef}(x,i)$, where the value of x for which $f_{Ef}(x,i)$ is minimized corresponds to the estimated skew value $\alpha_f$ for the forward transmission path;

$N_f(x,i)=x(T_1[i]-T_1[0])$ is a normalizing function of the phase offset $\theta_{Ef}[i]$; and the index i relates to a specific window of timing messages and the corresponding timestamps.

22. The networked time system according to claim 21, wherein only data points corresponding to a value of $\theta_{Ef}[i]$ which is higher than a running mean of $\theta_{Ef}$ are used in the first cost function $f_{Ef}(x,i)$.

23. The networked time system according to claim 20, wherein the second cost function $f_{Er}(x,i)$ for the reverse transmission path has the form:

$$f_{Er}(x,i)=\theta_{Er}[i]-N_r(x,i)-\min\{(\theta_{Er}[0]-N_r(x,0));\ldots;(\theta_{Er}[i]-N_r(x,i))\};$$

wherein:

$\theta_{Er}[i]=T_4[i]-T_3[i]$ is the measured phase offset corresponding to the reverse transmission path, where $T_3[i]$ is the timestamp recorded by the time client on sending of the ith timing message of the second type and $T_4[i]$ is the time of receipt as recorded by the time server on receipt of the ith timing message of the second type;

x is a parameter with respect to which the least squares fitting algorithm minimizes $f_{Er}(x,i)$ where the value of x for which $f_{Er}(x,i)$ is minimized corresponds to the estimated skew value $\alpha_r$ for the reverse transmission path;

$N_r(x,i)=x(T_4[i]-T_4[0])$ is a normalizing function of the phase offset $\theta_{Er}[i]$; and the index i relates to a specific window of timing messages and the corresponding timestamps.

24. The networked time system according to claim 23, wherein only data points corresponding to a value of $\theta_{Er}[i]$ which is lower than a running mean of $\theta_{Er}$ are used in the second cost function $f_{Er}(x,i)$.

25. The networked time system according to claim 20, wherein the control unit is configured to estimate the skew value $\alpha$ of the local clock by:

estimating the skew value $\alpha_f$ for the forward transmission path by using the least squares fitting algorithm to minimize the first cost function;

estimating the skew value $\alpha_r$ for the reverse transmission path by using the least squares fitting algorithm to minimize the second cost function; and calculating $\alpha$ from an average of $\alpha_f$ and $\alpha_r$.

26. The networked time system according to claim 20, wherein the control unit is configured to estimate the skew value $\alpha$ of the local clock by:

estimating the skew value $\alpha_f$ for the forward transmission path by using the least squares fitting algorithm to minimize the first cost function;

estimating the skew value $\alpha_r$ for the reverse transmission path by using the least squares fitting algorithm to minimize the second cost function; and setting $\alpha$ to be the one of $\alpha_f$ and $\alpha_r$ for which the corresponding minimized cost function has the lowest value.

27. The networked time system according to claim 20, wherein the control unit is configured to estimate the skew value $\alpha$ of the local clock by:

defining a combined cost function which includes both said first cost function and said second cost function; and estimating $\alpha$ by using the least squares fitting algorithm to minimize the combined cost function.

* * * * *

UNITED STATES PATENT AND TRADEMARK OFFICE
CERTIFICATE OF CORRECTION

PATENT NO. : 10,284,414 B2
APPLICATION NO. : 15/179288
DATED : May 7, 2019
INVENTOR(S) : Zdenek Chaloupka and Ivan Boyd Page 1 of 1

It is certified that error appears in the above-identified patent and that said Letters Patent is hereby corrected as shown below:

On the Title Page

(73) Assignees: please delete "Khalifa University of Scence, Technology and Research" and replace with ---Khalifa University of Science, Technology and Research---.

Signed and Sealed this
Eighth Day of October, 2019

Andrei Iancu
*Director of the United States Patent and Trademark Office*